US009142852B2

(12) United States Patent
Rittmann et al.

(10) Patent No.: US 9,142,852 B2
(45) Date of Patent: Sep. 22, 2015

(54) BICARBONATE AND CARBONATE AS HYDROXIDE CARRIERS IN A BIOLOGICAL FUEL CELL

(75) Inventors: Bruce E. Rittmann, Tempe, AZ (US); César I. Torres, Tempe, AZ (US); Hyung-Sool Lee, Waterloo (CA)

(73) Assignee: Arizona Board of Regents for and on Behalf of Arizona State University, Scottsdale, AZ (US)

(*) Notice: Subject to any disclaimer, the term of this patent is extended or adjusted under 35 U.S.C. 154(b) by 1069 days.

(21) Appl. No.: 12/999,903

(22) PCT Filed: Jun. 23, 2009

(86) PCT No.: PCT/US2009/048274
§ 371 (c)(1),
(2), (4) Date: Feb. 25, 2011

(87) PCT Pub. No.: WO2010/008836
PCT Pub. Date: Jan. 21, 2010

(65) Prior Publication Data
US 2011/0143224 A1    Jun. 16, 2011

Related U.S. Application Data

(60) Provisional application No. 61/074,852, filed on Jun. 23, 2008.

(51) Int. Cl.
*H01M 8/16* (2006.01)
*H01M 8/04* (2006.01)
*C25B 1/02* (2006.01)

(52) U.S. Cl.
CPC . *H01M 8/16* (2013.01); *C25B 1/02* (2013.01); *Y02E 60/527* (2013.01)

(58) Field of Classification Search
CPC .................................. H01M 8/16; C25B 1/02
USPC .................................................. 429/401, 428
See application file for complete search history.

(56) References Cited

U.S. PATENT DOCUMENTS 4,781,995 A * 11/1988 Giner ........................... 429/415
5,413,878 A   5/1995 Williams et al. .............. 429/425
(Continued)

FOREIGN PATENT DOCUMENTS

WO     WO 2010/008836         1/2010

OTHER PUBLICATIONS

Rozendal, RA et al. (2007) Perfromance of single chamber biocatalyzed electrolysis with different types of ion exchange membranes. Water Research 41:1984-1994.*

(Continued)

*Primary Examiner* — Karie O'Neill Apicella
(74) *Attorney, Agent, or Firm* — Norton Rose Fulbright US LLP (57) ABSTRACT

The present invention relates generally to a process that helps alleviate the pH gradient between anode and cathode compartments in any biological fuel cell or electrolytic cell configuration in which a pH gradient between anode and cathode is limiting the voltage efficiency. By providing acid to the cathode compartment in the form of $CO_2$, the pH gradient is reduced and voltage efficiency and power output are increased. In one embodiment, carbon dioxide produced in the anode chamber is recycled to the cathode chamber.

22 Claims, 4 Drawing Sheets

(56) References Cited

U.S. PATENT DOCUMENTS

| | | | |
|---|---|---|---|
| 7,060,382 B2 * | 6/2006 | Jahnke et al. | 429/410 |
| 2004/0229102 A1 * | 11/2004 | Jahnke et al. | 429/34 |
| 2006/0251959 A1 | 11/2006 | Karamanev | 429/101 |
| 2009/0233155 A1 * | 9/2009 | Littau | 429/40 |

OTHER PUBLICATIONS

Bullen, RA et al. (2006) Biofuel cells and their development. Biosens Bioeletron 21(11):2015-2045.

Chae, KJ et al. (2008) Mass Transport though a Proton Exchange Membrane (Nation) in Microbial Fuel Cells. Energy & Fuels 22:169-176.

Cheng, S et al. (2007) Sustainable and efficient biohydrogen production via electrohydrogenesis. Proc Natl Acad Sci 104:18871-18873.

Davis, F et al. (2007) Biofuel cells—Recent advances and applications. Biosens Bioeletron 22(7):1224-1235.

Fan, Y et al. (2007) Enhanced Coulombic efficiency and power density of air-cathode microbial fuel cells with an improved cell configuration. J Power Sources 171:348-354.

Gil, GC et al. (2003) Operating parameters affecting the performance of a mediator-less microbial fuel cell. Biosens Bioelectron 18:327-334.

Kim, JR et al. (2007) Power generation using different cation, anion and ultrafiltration membranes in microbial fuel cells. Environ Sci Technol 41:1004-1009.

Liu, H et al. (2004) Electricity generation using an air-cathode single chamber microbial fuel cell in the presence and absence of a proton exchange membrane. Environ Sci Technol 38:4040-4046.

Moon, H et al. (2006) Continuous electricity production from wastewater using mediator-less microbial fuel cell. Bioresource Technol 97:621-627.

PCT International Search Report and Written Opinion issued in PCT/US2009/048274 mailed Feb. 12, 2010, 2009.

Rabaey, K et al. (2005) Microbial fuel cells: sustainable core technology. Trends Biotechnol 23:291-298.

Rittmann, BE (2008) Opportunities for renewable bioenergy using microorganisms. Biotechnol Bioeng 100(2):203-212.

Rozendal, RA et al. (2006) Effects of membrane cation transport on pH and microbial fuel cell performance. Environ Sci Technol 40:5206-5211.

Rozendal, RA et al. (2007) Performance of single chamber biocatalyzed electrolysis with different types of ion exchange membranes. Water Res 41:1984-1994.

Topcagic, S et al. (2006) Development of a membraneless ethanol/oxygen biofuel cell. Electrochim Acta 51(11):2168-2172.

Torres, C et al. (2007) Kinetics of Consumption of Fermentation Products by Anode-Respiring Bacteria. Appl Microbiol Biotechnol 77: 689-697.

Torres, CL et al. (2008) Carbonate Species as OH—Carriers for Decreasing the pH Gradient between Cathode and Anode in Biological Fuel Cells. Environ Sci Technol, 42(23):8773-8777.

Torres, CL et al. (2008) Proton transport inside the biofilm limits electrical current generation by anode-respiring bacteria. Biotechnol Bioeng 100(5):872-81.

* cited by examiner

BICARBONATE AND CARBONATE AS HYDROXIDE CARRIERS IN A BIOLOGICAL FUEL CELL

This application is a national phase application under 35 U.S.C. §371 of International Application No. PCT/US2009/048274 filed Jun. 23, 2009, which claims priority to U.S. Provisional Patent Application Ser. No. 61/074,852 filed Jun. 23, 2008, the entire contents of which are hereby incorporated by reference without disclaimer.

BACKGROUND OF THE INVENTION

1. Field of the Invention

The present invention relates generally to fuel cells. More particularly, it concerns improving the performance of biological fuel cells by reducing the pH gradient between the cathode and anode compartments.

2. Description of Related Art

Biological fuel cells (BFCs) are widely researched today as a means to produce combustionless electrical energy from a wide variety of organic compounds present in water. BFCs can contain either an anode and cathode, in addition to a biological component. The biological component can either be an enzyme or a full cell (e.g., bacterium, microbe, algae, etc.). Chemical fuel cells consume hydrogen ($H_2$) and simple organic compounds (e.g., methane and methanol) by using precious-metal catalysts, usually platinum, and relatively high temperatures. BFCs use microorganism and/or enzymes as the catalysts and are capable of oxidizing many complex organic compounds, as well as simple organic molecules, present in water (Moon et al. 2006, Torres et al. 2007, Topcagic et al. 2006, Bullen et al. 2006). This capability of BFCs opens up the possibility of producing electrical energy directly from biomass feed stocks that are renewable and carbon-neutral fuels (Rabaey et al. 2005, Davis et al. 2007, Rittmann 2008).

All fuel cells have certain common features: (1) an electron donor (the fuel) is oxidized at the anode, which is a conductive solid that accepts the electrons from the donor; (2) a catalyst is needed to carry out the oxidation at the anode; (3) the electrons move through an electrical circuit from the anode to the cathode, which is another conductive solid; (4) at the cathode, the electrons are added to an electron acceptor, usually oxygen ($O_2$); and (5) either protons ($H^+$) move separately from the anode to the cathode or hydroxide ions ($OH^-$) move from the cathode to the anode to maintain electroneutrality in the anode compartment. Failure to transfer the $H^+$ ions from the anode compartment or $OH^-$ ions to the anode compartment can result in acidification of the anode compartment and a pH gradient between the compartments.

In chemical proton exchange membrane fuel cells (PEMFCs), an acidic pH condition (i.e., high concentration of $H^+$ ions and a low pH) can facilitate the transport of protons that is required between anode and cathode, as described by the following reactions:

Anodic PEMFC reaction: $\frac{1}{2}H_2 \rightarrow H^+ + e^-$

Cathodic PEMFC reaction: $\frac{1}{4}O_2 + H^+ + e^- \rightarrow \frac{1}{2}H_2O$ However, the use of microbes or other biological catalysts in the anodic compartment of a BFC normally requires a near-neutral pH (Bullen et al. 2006, Torres et al. 2008). The low proton concentration in the anodic compartment (0.1 μM at pH 7) contrasts with the relatively high concentration of other ionic components of biological media (buffers, salts in mM range), which are often needed to maintain the operation of BFC biological components. These high concentrations result in a limitation of proton transport between the anode and cathode compartments. To maintain electroneutrality, other ions are transported between the compartments (Rozendal et al. 2006, Chae et al. 2008). The result is a pH gradient, especially at high current densities, in which the anode compartment pH decreases and the cathode compartment pH increases (Gil et al. 2003). The practical effect of the pH gradient is a drop in voltage efficiency, which consequently decreases power generation. In microbial fuel cells, this pH difference was calculated by Rozendal et al. (2007) to be more than 4.4 pH units, which resulted in a potential loss of more than 0.26 V, or approximately 20% loss in available energy. Thus, there is a need for techniques for reducing the pH gradient between the cathode and anode compartments in biological fuel cells.

SUMMARY OF THE INVENTION

The inventors have discovered new methods and devices for reducing the pH gradient between the cathode and anode compartments in fuel cells by supplying carbon dioxide to the cathode compartment. In one embodiment, the present invention provides a method of operating a fuel cell having a cathode chamber, an anode chamber, and a pH gradient between the cathode and anode chambers, comprising supplying a gas flow to the cathode chamber, wherein the gas flow contains carbon dioxide at a concentration sufficient to reduce the pH gradient below what it would otherwise be if the gas flow contained either no carbon dioxide or carbon dioxide at a concentration below about 400 ppm. In some embodiments, the invention further comprises recycling carbon dioxide produced in the anode chamber to the cathode chamber.

In some embodiments, the carbon dioxide concentration in the gas flow is less than or equal to about 10%, including about 9.5%, 9%, 8.5%, 8%, 7.5%, 7%, 6.5%, 6%, 5.5%, 5%, 4.5%, 4%, 3.5%, 3%, 2.5%, 2%, 1.5%, 1%, and 0.5%. In other embodiments, the carbon dioxide concentration in the gas flow is less than or equal to about 5%, including about 4.5%, 4%, 3.5%, 3%, 2.5%, 2%, 1.5%, 1%, and 0.5%. In still other embodiments, the carbon dioxide concentration in the gas flow is less than or equal to about 2%, including about 1.5%, 1%, and 0.5%.

In one embodiment, the fuel cell is a biological fuel cell. In some embodiments, the biological fuel cell comprises a membrane, while in others it comprises no membrane. In certain embodiments, the membrane is an anion exchange membrane, a simple filter, or a J-cloth. In another embodiment, the biological fuel cell is an enzyme-catalyzed fuel cell, while in another embodiment it is an electrolytic cell that produces hydrogen gas from organic materials.

In still another embodiment, the invention is a fuel cell comprising: a cathode chamber, an anode chamber, a pH gradient between the cathode and anode chambers, and a gas flow to the cathode chamber; wherein the gas flow contains carbon dioxide at a concentration sufficient to reduce the pH gradient below what it would otherwise be if the gas flow contained either no carbon dioxide or carbon dioxide at a concentration below about 400 ppm. In one embodiment, the fuel cell is configured to recycle carbon dioxide produced in the anode chamber to the cathode chamber.

It is contemplated that any method or composition described herein can be implemented with respect to any other method or composition described herein.

The carbon dioxide concentrations recited herein are by volume (i.e., ppm by volume and % by volume).

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the standard deviation of error for the device or method being employed to determine the value.

Following long-standing patent law, the words "a" and "an," when used in conjunction with the word "comprising" in the claims or specification, denotes one or more, unless specifically noted.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Descriptions of well-known processing techniques, components, and equipment are omitted so as not to unnecessarily obscure the present methods and devices in unnecessary detail. Other objects, features and advantages of the present invention will become apparent from the following detailed description. It should be understood, however, that the detailed description and the specific examples, while indicating specific embodiments of the invention, are given by way of illustration only, as various changes and modifications within the spirit and scope of the invention will become apparent to those skilled in the art from this detailed description.

BRIEF DESCRIPTION OF THE DRAWINGS

The following drawings illustrate by way of example and not limitation. Identical reference numerals do not necessarily indicate an identical structure. Rather, the same reference numeral may be used to indicate a similar feature or a feature with similar functionality. Every feature of each embodiment is not always labeled in every figure in which that embodiment appears, in order to keep the embodiments clear. The drawings form part of the present specification and are included to further demonstrate certain aspects of the present invention. The invention may be better understood by reference to one or more of these drawings in combination with the description of illustrative embodiments presented herein.

DESCRIPTION OF ILLUSTRATIVE EMBODIMENTS

Figure 1:
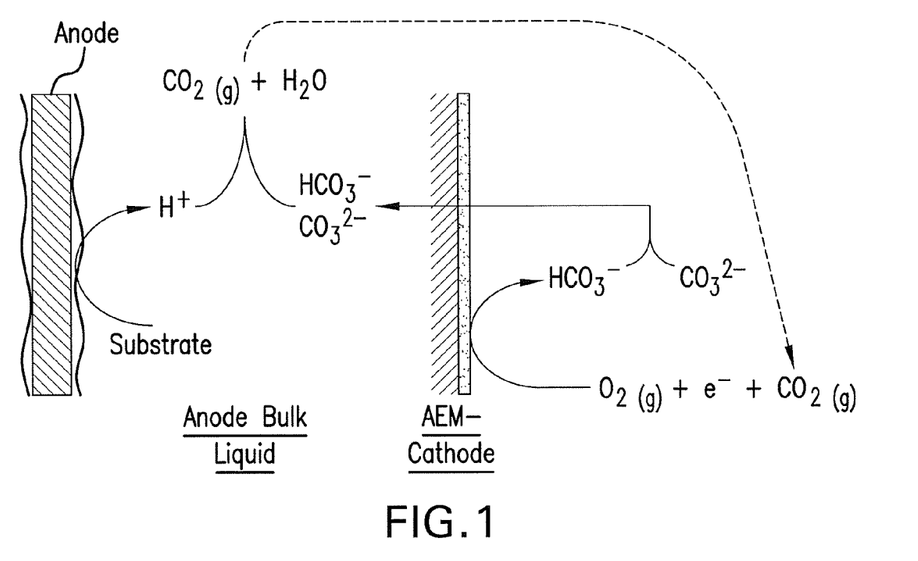
FIG. 1 is a schematic diagram of the OH⁻ transport process to reduce the pH gradient between anode and cathode using bicarbonate/carbonate, according to one embodiment of the claimed invention. The dashed line indicates the possibility to recycle $CO_2$ from the anode compartment into the cathode compartment.

The present invention relates generally to a process that helps alleviate the pH gradient between anode and cathode compartments, thereby increasing the voltage efficiency and power output, in any biological fuel cell or electrolytic cell configuration in which a pH gradient between anode and cathode is limiting the voltage efficiency. This result is achieved by providing acid to the cathode compartment in the form of $CO_2$. To illustrate the general principle upon which the invention is based, the cathodic oxygen reduction reaction is written so that it produces hydroxide ion ($OH^-$):

The presence of a buffer, such as phosphate, in the cathode compartment can absorb the $OH^-$ ions and prevent the build up of a large pH gradient over short periods of time, as reported by Kim et al. (2007). However, to prevent a large pH gradient for long-term operation, an acidic buffer component must be supplied that can be fed continuously at a low cost. Carbon dioxide gas ($CO_2$) is such a buffer, and it reacts with $OH^-$ to form bicarbonate ($HCO_3^-$) or carbonate ($CO_3^{2-}$):

Furthermore, $CO_2$ is continuously produced in the anode chamber as a result of organic matter oxidation: e.g., Thus, the bicarbonate/carbonate system in a BFC can be relied upon to transport $OH^-$ ions between anode and cathode compartments, as shown in FIG. 1. The $CO_2$ fed into the cathode chamber combines with the $OH^-$ produced by the cathodic oxygen-reduction reaction above to form $HCO_3^-$ and/or $CO_3^{2-}$, which flows across an anion exchange membrane (AEM) into the anode chamber to maintain electroneutrality. In the anode chamber, $HCO_3^-$ or $CO_3^{2-}$ combines with $H^+$ produced as a result of substrate oxidation to produce $CO_2$ again. The overall process does not require any buffer addition, as $CO_2$ can be recycled between anode and cathode compartments.

The $pK_a$ of $CO_2/HCO_3^-$ ($pK_{a1}$~6.3) and $HCO_3^-/CO_3^{2-}$ ($pK_{a3}$~10.3) are advantageous for the bicarbonate/carbonate transport of the present invention, because a small concentration of $CO_2$ can maintain a high $HCO_3^-$ concentration at near-neutral pH values. For example, 5% $CO_2$ in air results in an equilibrium $HCO_3^-$ concentration of 168 mM at pH=8.3. This high $HCO_3^-$ concentration allows high anion current densities across the membrane, while maintaining a near-neutral pH and minimizing voltage loss. At higher pH values, the $CO_3^{2-}$ concentration is significant and can become dominant in the transport of $OH^-$ equivalents across the compartments.

In the experiments detailed in the below Example, an anion exchange membrane (AEM) was used, which is beneficial in this application because it allows transport of $HCO_3^-$ and $CO_3^{2-}$ from cathode to anode. However, other membranes can be used as long as they allow the transport of bicarbonate and carbonate into the anode compartment. Previous studies have shown that a simple filter, J-cloth, or no membrane at all are effective at producing electrical power in microbial fuel cells (MFCs) (Fan et al. 2007, Liu et al. 2004) and could be effective in the bicarbonate transport process.

The process of $CO_2$ addition can be applied to many types of BFCs other than the MFC application used in experiments detailed in the below Example. It can also be applied to enzyme-catalyzed fuel cells that operate at a near-neutral pH, as well as electrolytic cells that produce $H_2$ gas from organic materials.

EXAMPLE

The following example is included to demonstrate preferred embodiments of the invention. It should be appreciated by those of skill in the art that the techniques disclosed in the example represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Figure 2:
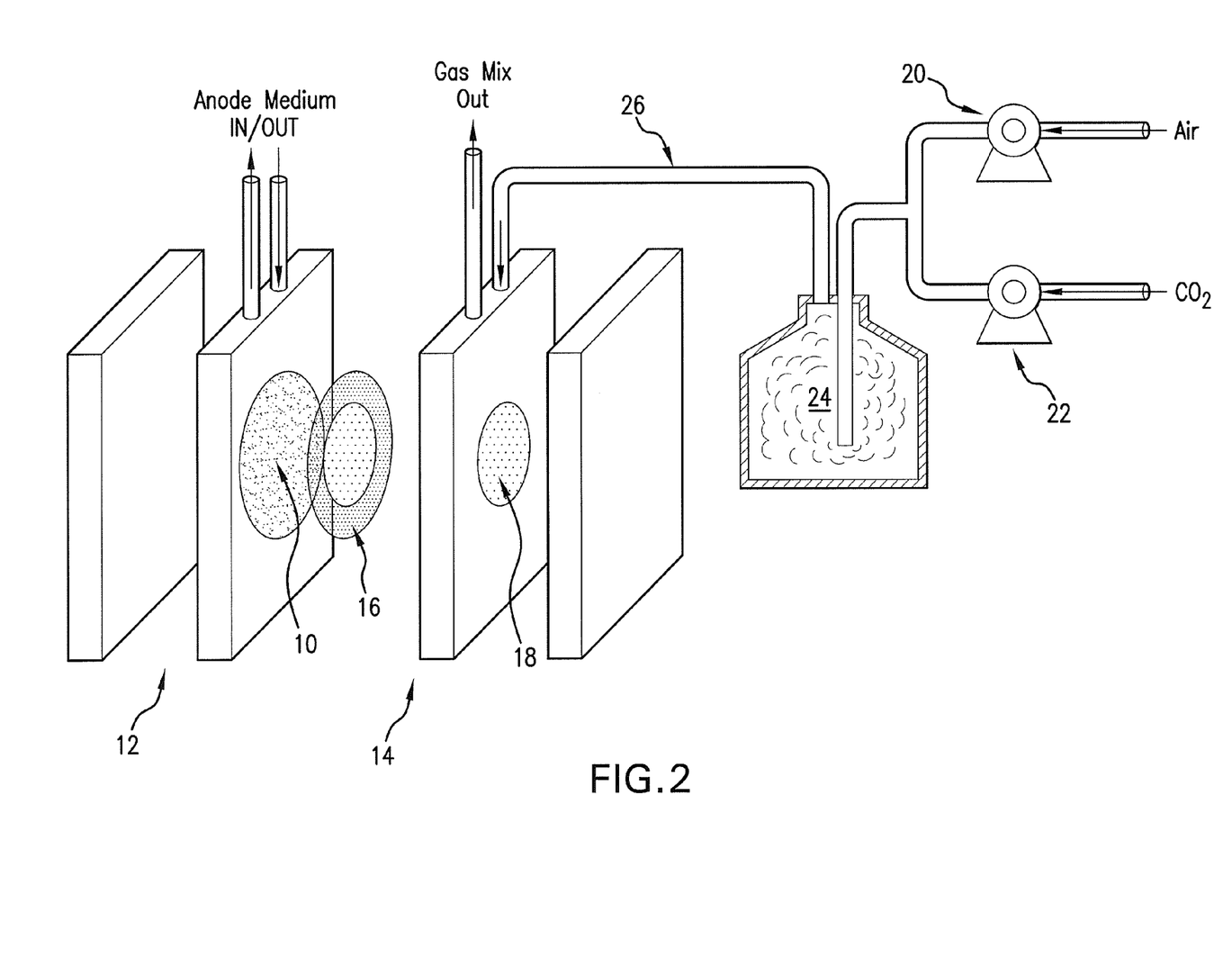
FIG. 2 is a schematic diagram of a microbial fuel cell (MFC) reactor with air/$CO_2$ feed in the cathode compartment, according to one embodiment of the claimed invention.

A continuous MFC was used to carry out experiments to evaluate the inventors' discovery. The configuration of the MFC is shown schematically in FIG. 2. The volume of anode compartment 10 was 20 mL and was filled with graphite granules with 50% porosity. The anode inoculum was a mixed culture of acclimated anode-respiring bacteria (ARB). The anode 12 was fed a nutrient medium with 25 mM acetate as organic substrate for bacterial metabolism. The cathode 14 was a carbon cloth with 5% Pt loading with a surface area of 7.5 cm$^2$ (GDE HT-140 EW, E-TEK, Germany). The carbon cloth was pressed against an anion exchange membrane (AEM) 16 (Selemion AMV, Asahi Glass Company, Japan). The cathode compartment 18 was a closed gas chamber to allow a flow of air/$CO_2$ mixtures from peristaltic pumps 20 and 22 and gas humidifier/mixer 24. The total gas flow 26 to the cathode 14 was 80 mL/min. The anode liquid was recirculated at 5 ml/min and the reactor was maintained at 32° C.

Effluent samples were analyzed for acetate concentrations using high-performance liquid chromatography (HPLC) (Shimadzu LC-20AT, Japan) with an Aminex HPX-87H column (Biorad Laboratories, Milan, Italy) at 30° C. and with a diode array detector. The eluent was 2.5 mM $H_2SO_4$ at 0.6 ml/min. Effluent samples were always >20 mM acetate to ensure substrate saturation in the anode compartment. Effluent samples were also measured for total carbonate species ($H_2CO_3 + HCO_3^- + CO_3^{2-}$) concentrations using an ion chromatograph (IC) (Dionex ICS-3000, California, USA) with a Dionex IonPac AS18 column (4 mm×250 mm) and a Dionex suppressor (ASRS 4 mm at 88 mA). The eluent was produced with a KOH eluent generator at 1 mL/min using a 22-35 mM gradient (22 mM at 0-8 min, 22-35 mM at 8-9 min, 35 mM at 9-16 min). All HPLC and IC samples were run in duplicate.

Polarization curves were generated for the MFC by changing the external resistance of the MFC in the range of 5 to 900Ω, and evaluation was also performed at the open-cell voltage. Voltage/current data was collected across the resistor in intervals of 2 minutes using LABVIEW software and a National Instruments BNC-2110 analog interface. The evaluators waited at least 45 minutes for each condition and averaged the last 20 minutes of data. Given that the experiments focused on optimizing the cathode performance, the reported current was normalized to the geometrical electrode surface area of the cathode (7.5 cm$^2$) for comparison among experiments.

Figure 3A:
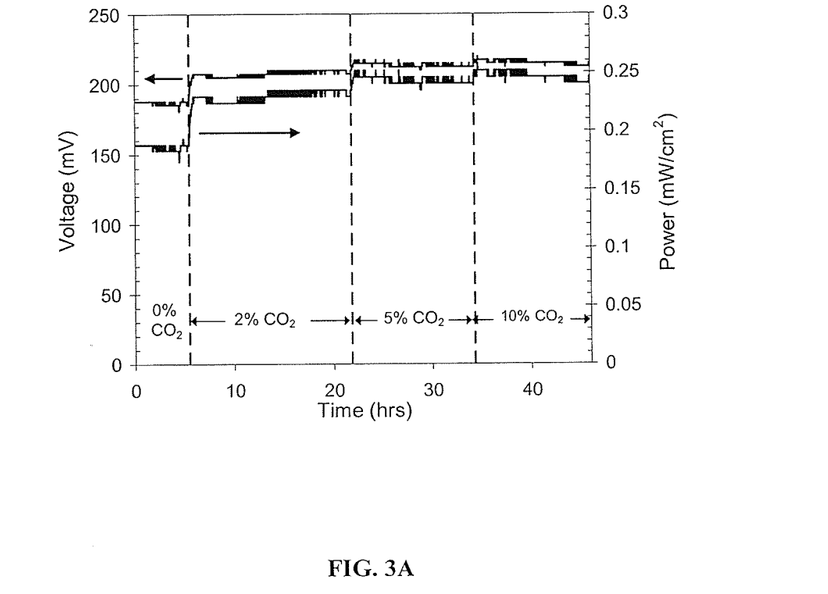
FIGS. 3A-3B are graphs showing the voltage (a), power (a), and bicarbonate concentration in the anode compartment (b) during different periods of $CO_2$ addition with a fixed resistor (25Ω), according to one embodiment of the claimed invention.

FIG. 3A shows the effects of adding $CO_2$ to the air flow to the cathode as a function of time and using a constant resistor of 25Ω in the MFC circuit. Voltage and power increased when the air flow contained 2% $CO_2$ (versus air, which has only ~380 ppm $CO_2$). The increase in power was higher than the increase in voltage, as current and voltage increased with $CO_2$ addition. An increase in the $CO_2$ concentration from 2% to 5% yielded a further small increase in voltage/power density, but increasing the $CO_2$ concentration to 10% had negligible effect.

In order to quantify the flow of $HCO_3^-$ and/or $CO_3^{2-}$, a high phosphate buffer concentration (100 mM) was added in the anode medium. This allowed the bicarbonate/carbonate to pass through the AEM and be retained in the liquid phase almost exclusively as $HCO_3^-$, because the anode pH only decreased from 7.5 to 7.3 throughout the experiment. Thus, the $H^+$ produced by bacteria as a result of acetate oxidation were mostly reacting with the phosphate buffer and were not forming $CO_2$ gas, which could evolve out of the anode chamber.

Figure 3B:
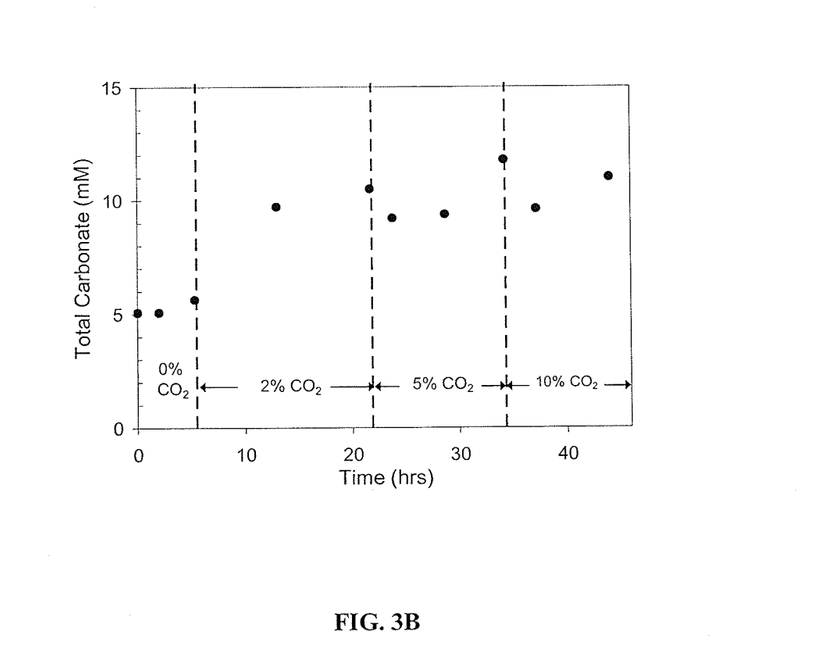

FIG. 3B shows the total carbonate (i.e., $HCO_3^-$ and $CO_3^{2-}$) concentrations in the anode compartment throughout the experiment. Given that the medium used did not contain any $HCO_3^-$ or $CO_3^{2-}$, all the $HCO_3^-$ and/or $CO_3^{2-}$ present were derived from acetate oxidation and/or $CO_2$ feed in the cathode compartment. At 0% $CO_2$, the total carbonate concentration was 5.3±0.3 mM as a result of acetate oxidation alone, indicating that approximately 2.5 mM acetate was converted to $HCO_3^-$ and $CO_3^{2-}$. When $CO_2$ was added to the air flow in the cathode, the total carbonate concentration increased to 10.2±0.9 mM, a clear indication that $CO_2$ was flowing through the AEM as $HCO_3^-$ or $CO_3^{2-}$. However, the increase of $CO_2$ from 2% to 5% and 10% did not seem to increase the total carbonate concentration significantly. This is consistent with the results in FIG. 3A, in which increases in $CO_2$ concentration over 2% did not increase current and power density significantly. This indicated that the rate of $HCO_3^-/CO_3^{2-}$ production at the cathode and its transfer to the anode compartment reached plateaus.

In order to obtain electroneutrality using $HCO_3^-/CO_3^{2-}$ as the means for transporting $OH^-$ equivalents from the cathode to the anode, the rate of $HCO_3^-/CO_3^{2-}$ transport should equal the amount of electron equivalents circuited through the MFC. The total current in the MFC was ~8.5 mA when fed with 5-10% $CO_2$. This corresponds to an $e^-$ flow of $5.3 \times 10^{-3}$ $e^-$ meq/min, which must be balanced by a counter flow of $5.3 \times 10^{-3}$ mmol $HCO_3^-$/min, $2.65 \times 10^{-3}$ mmol $CO_3^{2-}$/min, or a combination thereof. Based on the influent flow rate of 0.4 ml/min, this transport rate of only $HCO_3^-$ should result in an increase in total carbonate in the anode medium of 13.3 mM. However, if the transport occurs through only $CO_3^{2-}$, the increase should be 6.65 mM. Therefore, the expected increase in total carbonate in the medium is 6.6 mM. At the end of the 5% experiment, the measured increase in total carbonate in the anode medium was 6.7 mM, a value that is consistent with $CO_3^{2-}$ transport, rather than $HCO_3^-$. This dominance by $CO_3^{2-}$ is an indication that the pH gradient was minimized, but not completely avoided, because $CO_3^{2-}$ would be dominant at high pH values (above pH 10).

Figure 4A:
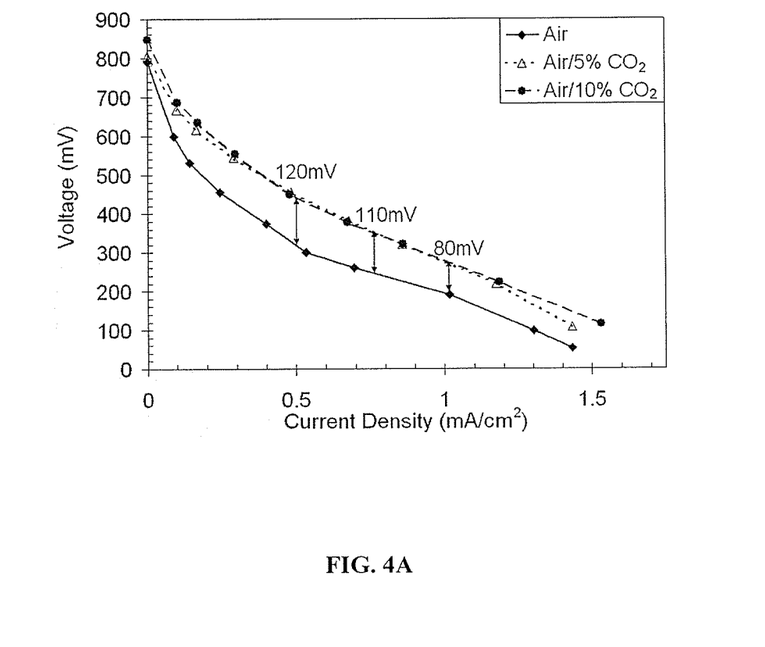
FIGS. 4A-4B are graphs showing the increase in microbial fuel cell voltage (a) and power (b) as a result of $CO_2$ addition to the air fed in the cathode compartment, according to one embodiment of the claimed invention.
Figure 4B:
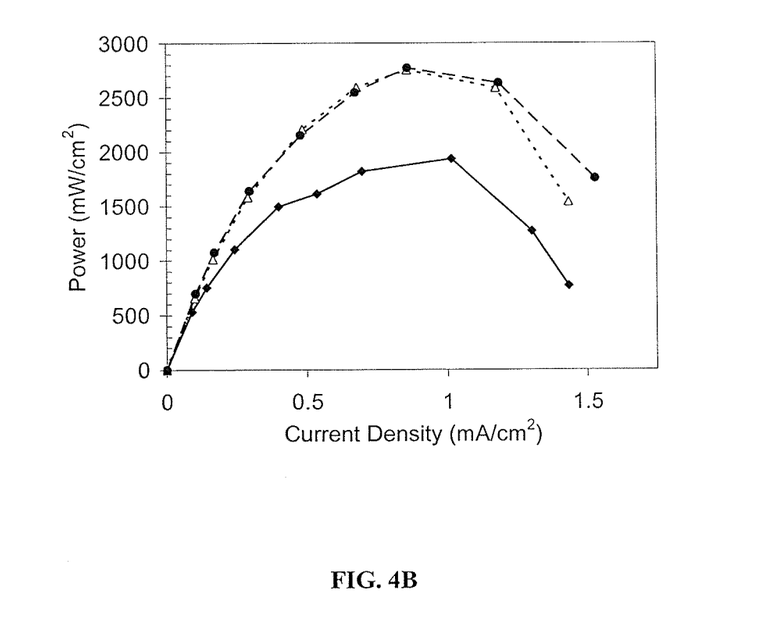

FIG. 4A shows the decrease in potential as a function of current density. The addition of 5% $CO_2$ to the air flow in the cathode increased the operational voltage between 80-120 mV in the area of maximum power output. An increase of 120 mV is consistent with a decrease of two pH units in the cathode compartment. Because pH values in the cathode compartment have been reported to be as high as pH 13 (Rozendal et al. 2007), it is possible that there was still a pH gradient between the anode and cathode compartments, but it was significantly reduced by $CO_2$ addition. As the current density increased, the gap between experiment operational voltage of the control experiment and $CO_2$ addition decreased to 80 mV. This decrease in the gap is an indication of an increase in the cathode pH as the current density increased. The maximum power output increased from 1.9 $W/m^2$ to 2.8 $W/m^2$ by the addition of 5% $CO_2$ in the air stream (FIG. 4B). This is a 45% increase in power as a result of an increase in voltage efficiency. However, an increase to 10% $CO_2$ did not show any significant improvement in the voltage output.

In the experimental setup used for this Example, it was not possible to document the pH gradient between anode and cathode compartment directly because of the lack of water in the cathode compartment (an air cathode). However, the increase in operational voltage is a clear indication of a decrease in pH gradient, as this problem is known to be responsible for as much as 240 mV of the potential loss (Rozendal et al. 2007). The results show an increase of as much as 120 mV in operational voltage by using an air/$CO_2$ mixture. Given that the experiments were performed in the same reactor, the increase in voltage can only be attributed to a decrease in pH gradient, as ohmic resistances and electrode over-potentials should stay the same. The increase in 120 mV corresponds to a 2 pH unit decrease in the pH gradient.

The results of this Example demonstrate that the pH gradient between anode and cathode compartments in BFCs can be mitigated by the addition of carbon dioxide to the air flow to the cathode. Decreasing the pH gradient resulted in an increase in voltage efficiency and power output by adding $CO_2$ to the cathode air at current densities of ~1 $mA/cm^2$.

REFERENCES

Each of the following references is specifically incorporated herein by reference in its entirety:

Bullen, R. A., T. C. Arnot, J. B. Lakeman, and F. C. Walsh, "Biofuel cells and their development," *Biosens. Bioeletron.*, 2006, 21(11), 2015-2045.

Chae, K. J., M. Choi, F. F. Ajayi, W. Park, I. S. Chang, and I. S. Kim, "Mass Transport though a Proton Exchange Membrane (Nafion) in Microbial Fuel Cells," *Energy & Fuels*, 2008, 22, 169-176.

Cheng, S. and B. E. Logan, "Sustainable and efficient biohydrogen production via electrohydrogenesis," *Proc. Nat'l Acad. Sci.*, 2007, 104: 18871-18873.

Davis, F., S. P. J. Higson, "Biofuel cells—Recent advances and applications," *Biosens. Bioeletron.*, 2007, 22(7), 1224-1235.

Fan, Y., H. Hu, and H. Liu, "Enhanced Coulombic efficiency and power density of air-cathode microbial fuel cells with an improved cell configuration," *J. Power Sources*, 2007, 171:348-354.

Gil, G. C., I. S. Chang, B. H. Kim, M. Kim, J. K. Jang, H. S. Park, and H. J. Kim, "Operating parameters affecting the performance of a mediator-less microbial fuel cell," *Biosens. Bioelectron.*, 2003, 18, 327-334.

Kim, J. R., S. E. Oh, S. Cheng, and B. E. Logan, "Power generation using different cation, anion and ultrafiltration membranes in microbial fuel cells," *Environ. Sci. Technol.*, 2007, 41:1004-1009.

Liu, H. and B. E. Logan, "Electricity generation using an air-cathode single chamber microbial fuel cell in the presence and absence of a proton exchange membrane," *Environ. Sci. Technol.*, 2004, 38:4040-4046.

Moon, H., I. S. Chang, and B. H. Kim, "Continuous electricity production from wastewater using mediator-less microbial fuel cell," *Bioresource Tech.*, 2006, 97, 621-627.

Rabaey, K. and W. Verstraete, "Microbial fuel cells: sustainable core technology," *Trends Biotechnol.*, 2005, 23, 291-298.

Rittmann, B. E., "Opportunities for renewable bioenergy using microorganisms," *Biotechnol. Bioeng.*, 2008, 100 (2), 203-212.

Rozendal, R. A., H. V. M. Hamelers, R. J. Molenkamp, and C. J. N. Buisman, "Performance of single chamber biocatalyzed electrolysis with different types of ion exchange membranes," *Water. Res.*, 2007, 41:1984-1994.

Rozendal, R. A., H. V. M. Hamelers, and C. J. N. Buisman, "Effects of membrane cation transport on pH and microbial fuel cell performance," *Environ. Sci. Technol.*, 2006, 40, 5206-5211.

Topcagic, S. and S. D. Minteer, "Development of a membraneless ethanol/oxygen biofuel cell," *Electrochim. Acta*, 2006, 51(11), 2168-2172.

Tones, C. I., A. K. Marcus, and B. E. Rittmann, "Kinetics of Consumption of Fermentation Products by Anode-Respiring Bacteria," *Appl. Microbiol. Biotechnol.*, 2007, 77: 689-697.

Torres, C. I., A. K. Marcus, and B. E. Rittmann, "Proton transport inside the biofilm limits electrical current generation by anode-respiring bacteria," *Biotechnol. Bioeng.*, 2008, 100(5):872-81.

The invention claimed is:

1. A method of operating a fuel cell having a cathode chamber, an anode chamber, and a pH gradient between the cathode and anode chambers, comprising:
   supplying a gas flow to the cathode chamber;
   wherein the gas flow contains carbon dioxide at a concentration of less than or equal to about 5%,
   wherein at least a portion of the carbon dioxide contained in the gas flow was produced in the anode chamber and recycled to the cathode chamber.

2. The method of claim 1, wherein the carbon dioxide concentration in the gas flow is less than or equal to about 2%.

3. The method of claim 1, wherein the fuel cell is a biological fuel cell.

4. The method of claim 3, wherein the biological fuel cell comprises a membrane.

5. The method of claim 4, wherein the membrane is an anion exchange membrane.

6. The method of claim 4, wherein the membrane is a simple filter.

7. The method of claim 4, wherein the membrane is a J-cloth.

8. The method of claim 3, wherein the biological fuel cell comprises no membrane.

9. The method of claim 3, wherein the biological fuel cell is an enzyme-catalyzed fuel cell.

10. A fuel cell comprising:
    a cathode chamber,
    an anode chamber,
    a pH gradient between the cathode and anode chambers, and
    a gas flow to the cathode chamber;
    wherein the gas flow contains carbon dioxide at a concentration of less than or equal to about 5%,
    wherein at least a portion of the carbon dioxide contained in the gas flow was produced in the anode chamber and recycled to the cathode chamber.

11. The fuel cell of claim 10, wherein the carbon dioxide concentration in the gas flow is less than or equal to about 2%.

12. The fuel cell of claim 10, wherein the fuel cell is a biological fuel cell.

13. The fuel cell of claim 12, wherein the biological fuel cell comprises a membrane.

14. The fuel cell of claim 13, wherein the membrane is an anion exchange membrane.

15. The fuel cell of claim 13, wherein the membrane is a simple filter.

16. The fuel cell of claim 13, wherein the membrane is a J-cloth.

17. The fuel cell of claim 12, wherein the biological fuel cell comprises no membrane.

18. The fuel cell of claim 12, wherein the biological fuel cell is an enzyme-catalyzed fuel cell.

19. The method of claim 1, wherein carbon dioxide contained in the gas flow consists of one or more of carbon dioxide produced in the anode chamber and carbon dioxide in air.

20. The fuel cell of claim 12, wherein carbon dioxide contained in the gas flow consists of one or more of carbon dioxide produced in the anode chamber and carbon dioxide in air.

21. A method of operating an electrochemical cell having a cathode chamber, an anode chamber, and a pH gradient between the cathode and anode chambers, comprising:
supplying a gas flow to the cathode chamber;
wherein the gas flow contains carbon dioxide at a concentration of less than or equal to about 5%, and
wherein at least a portion of the carbon dioxide contained in the gas flow was produced in the anode chamber and recycled to the cathode chamber.

22. The method of claim 21, wherein the electrochemical cell is a biological electrolytic cell that produces hydrogen gas from organic materials.

* * * * *